(12) United States Patent
Baldauf (10) Patent No.: US 7,083,418 B2
(45) Date of Patent: Aug. 1, 2006

(54) PEDIATRIC CONGENITAL HEART DEFECT REPAIR MODEL

(75) Inventor: Mary Baldauf, Valley Stream, NY (US)

(73) Assignee: Baldy by Design, LLC, Valley Stream, NY (US)

( * ) Notice: Subject to any disclaimer, the term of this patent is extended or adjusted under 35 U.S.C. 154(b) by 394 days.

(21) Appl. No.: 10/686,692

(22) Filed: Oct. 16, 2003

(65) Prior Publication Data

US 2005/0084834 A1  Apr. 21, 2005

(51) Int. Cl.
*G09B 23/28* (2006.01)
(52) U.S. Cl. ...................... 434/272; 434/267
(58) Field of Classification Search ................ 434/262, 434/267, 268, 272
See application file for complete search history.

(56) References Cited

U.S. PATENT DOCUMENTS

| | | | |
|---|---|---|---|
| 3,688,008 A | | 8/1972 | Krieger, Sr. |
| 4,058,910 A | * | 11/1977 | Funk ............................ 40/381 |
| 4,288,222 A | * | 9/1981 | Kling .......................... 434/272 |
| 4,734,039 A | * | 3/1988 | Thompson .................. 434/274 |
| 5,061,188 A | | 10/1991 | McCollum |
| 5,149,270 A | * | 9/1992 | McKeown ................... 434/262 |
| 5,356,295 A | * | 10/1994 | Grosz .......................... 434/267 |
| 5,374,194 A | | 12/1994 | Walcerz et al. |
| 5,403,191 A | * | 4/1995 | Tuason ........................ 434/262 |
| 5,634,797 A | | 6/1997 | Montgomery |
| 5,795,157 A | * | 8/1998 | Weber et al. ................ 434/269 |
| 5,947,744 A | | 9/1999 | Izzat |
| 5,951,301 A | | 9/1999 | Younker |
| 6,004,136 A | * | 12/1999 | Ehrenpreis ................... 434/262 |
| 6,062,866 A | | 5/2000 | Prom |
| 6,074,214 A | | 6/2000 | Browne-Wilkinson |
| 6,159,017 A | * | 12/2000 | Coomansingh ............. 434/267 |
| 6,234,804 B1 | | 5/2001 | Yong |
| 6,336,812 B1 | * | 1/2002 | Cooper et al. .............. 434/267 |
| 6,461,165 B1 | | 10/2002 | Takashina et al. |
| 6,471,518 B1 | | 10/2002 | Beattie |
| 6,511,325 B1 | | 1/2003 | Lalka et al. |
| 6,544,041 B1 | | 4/2003 | Damadian |
| 6,685,481 B1 | * | 2/2004 | Chamberlain ............... 434/272 |
| 2001/0019818 A1 | | 9/2001 | Yong |

* cited by examiner

*Primary Examiner*—Kurt Fernstrom
(74) *Attorney, Agent, or Firm*—Dilworth & Barrese LLP (57) ABSTRACT

The present invention is directed to a model for teaching or illustrating surgical and/or medical technique, and having a base component representing tissue or an organ and several components structured and arranged to be couplable to and detachable from the base component and/or to each other, to illustrate different positions of the components with respect to one another representing different phases in surgical and/or medical techniques.

21 Claims, 11 Drawing Sheets

PEDIATRIC CONGENITAL HEART DEFECT REPAIR MODEL

BACKGROUND OF THE INVENTION

The present invention is directed to a model for teaching medical and surgical procedure. More particularly, the present invention provides a model for effectively teaching complicated surgical procedure such as cardiac surgery.

Versatility of medical and surgical procedure has tremendously increased in recent years with it now being quite possible to treat certain medical ailments and defects that, a few years ago, were considered hopelessly untreatable. For example, it is now possible to surgically repair the congenital heart defect of hypoplastic left heart syndrome in which an infant is born with an insufficiently developed left ventricle in addition to other cardiac defects such as a defective aortic valve. Previously, such infants only lived a short time after birth, there being no known way to repair this defect. However, it has now been discovered that by performing a series of surgeries, starting almost immediately after birth and concluding at about the age of 7, this defect can be repaired with resulting cardiac functioning approximating that of a normally formed heart. The oldest living patient who had suffered from this defect and underwent the series of surgeries for repair has just reached adulthood, confirming the success of this surgical procedure.

Accordingly, such surgical procedure will be increasingly adopted to repair such congenital cardiac defect in addition to other severe medical and cardiac defects, congenital or otherwise. With increasing use of such complicated surgical procedure, it becomes increasingly important to properly instruct surgical and medical practitioners, in addition to support staff such as nurses, of the proper surgical technique and procedure. Ideally, it should be possible to permit such personnel to practice with a model, e.g., of a heart, to gain understanding of the various steps required to repair a defect such as hypoplastic left heart syndrome.

Previously, however, no such effective teaching model had been developed. While several models exist for teaching various medical and surgical procedures, e.g., in a classroom, models for teaching rather complicated surgical procedure have not yet been provided. For example, U.S. Pat. No. 5,634,797 to Montgomery discloses a teaching aid constituted by a doll containing realistic replaceable heart models simulating a variety of cardiac defects, including mitral valve atresia disorder and hypoplastic left ventricle (column 5, lines 10–50 and FIGS. 10 and 23). These heart models can be attached to a pump unit to provide realistic flow of sonographic fluid therethrough, the goal being teaching the practice of sonography in recognizing heart disorders (column 6, lines 50–64). Thus, Montgomery is directed to teaching a diagnostic technique and not surgical procedure.

Accordingly, it is an object of the present invention to improve teaching of medical and/or surgical procedure, especially with respect to complicated surgical procedures that have recently and successfully been developed, e.g., repairing hypoplastic left heart syndrome.

It is also an object of the present invention to provide a teaching model which can easily be used to teach a variety of surgical techniques in various stages.

It is a further object of the present invention to improve surgery, medical treatment and care of patients by improving instruction in medical and/or surgical procedure in accordance with a teaching model.

SUMMARY OF THE INVENTION

These and other objects are attained by the present invention which is directed to a model for teaching or illustrating surgical and/or medical technique, comprising a base component representing tissue or an organ and several components structured and arranged to be couplable to and detachable from the base component and/or to one another, to illustrate different positions of the components with respect to one another representing different phases in the surgical and/or medical technique. The components constituting the model can be formed from ceramic, clay or synthetic material such as plastic, with male/female snap couplings being formed at respective ends thereof to allow coupling, detaching and re-coupling of the various components with one another in the different positions.

In particular, the base component of such teaching model represents the heart, with other components being tube-shaped and constituting veins, arteries or surgical material. These various components are preferably color-coded to facilitate illustration of various surgical and medical techniques. In particular, the inventive model can be used to illustrate the sophisticated surgical repair of hypoplastic left heart syndrome, although other surgical techniques, e.g., on the heart, can be illustrated and taught with the inventive model.

The inventive model greatly facilitates understanding of surgical procedure and is effectively used to instruct students in complicated surgical technique that is continuously evolving and being improved. Therefore, medical and surgical personnel can be successfully instructed with the result being improved performance by such personnel both during such surgery and in the resulting care of the patients. Improved recovery by such patients is thereby naturally attained.

BRIEF DESCRIPTION OF THE DRAWINGS

The present invention will now be described in greater detail with reference to the accompanying drawings in which.

DESCRIPTION OF THE PREFERRED EMBODIMENTS

Similar components forming the teaching model of the present invention will be referred to by similar reference numerals or characters in all the illustrated embodiments or stages.

Figure 1:
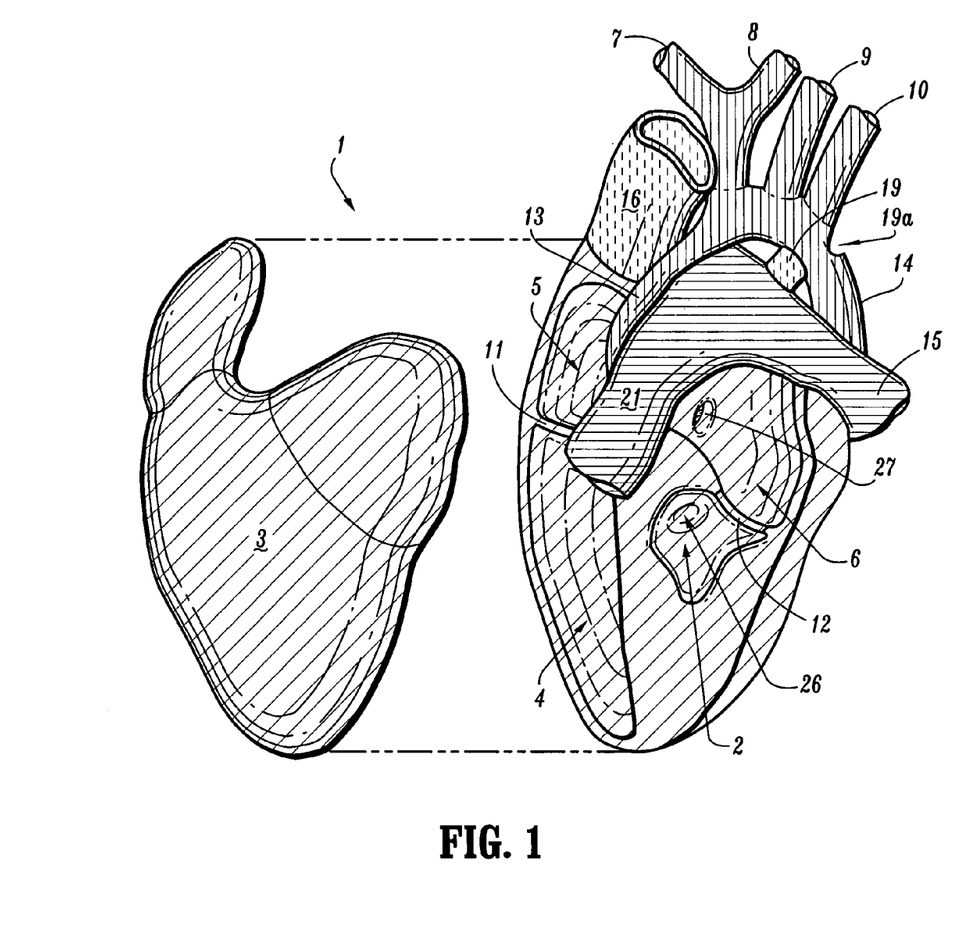
FIG. 1 is an exploded left anterior oblique view of a teaching model for a heart in accordance with the present invention and illustrating a pre-operative defective condition of the heart.
Figure 2:
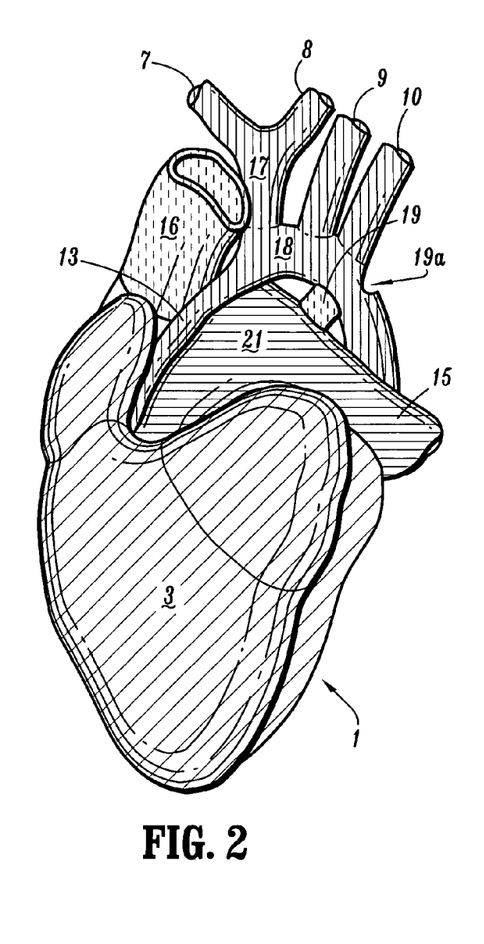
FIG. 2 is a left anterior oblique view of the assembled heart model shown in FIG. 1.

The teaching model 1 illustrated in FIGS. 1 and 2 illustrates a human heart having a congenital preoperative defect, namely hypoplastic left heart syndrome. In such condition, the left ventricle 2 of the heart is insufficiently formed or expanded during fetal development, with the result being presence of a tiny or virtually nonexistent left ventricle 2 in the heart of a newborn infant. Such defect resulted in the heart being unable to pump sufficient blood flow through the infant, the tragic result being failure of the heart within a short time after birth, e.g., not more that a few weeks. In FIGS. 1 and 2, reference numeral 3 denotes the anterior portion of myocardium while reference numeral 4 denotes the right ventricle, reference numeral 5 the right atrium, reference numeral 6 the left atrium and reference numeral 2 the defective left ventricle. Additionally, reference numerals 7–10 respectively denote the right subclavian artery, the right common carotid artery, the left common carotid artery, and the left subclavian artery. The tricuspid and mitral valves are respective denoted by reference numerals 11 and 12. Additionally, reference numerals 13–15 respectively denote the ascending aorta, descending aorta and left pulmonary artery in FIGS. 1 and 2, with reference numerals 16–19 respectively denoting the superior vena cava, brachiochephalic artery, aortic arch and patent ductus arteriosus in FIGS. 1 and 2.

Figure 3:
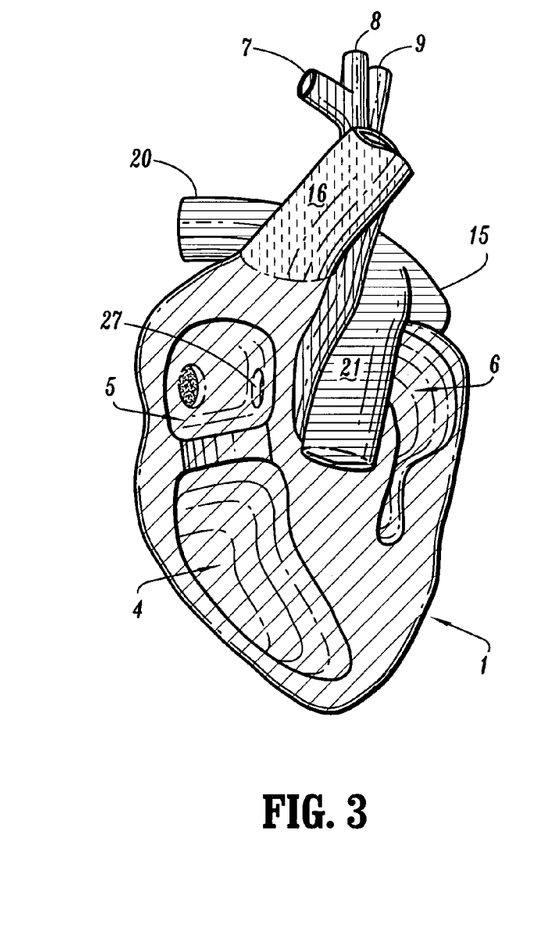
FIG. 3 is a right anterior oblique view of the heart model shown in FIGS. 1 and 2 and with the anterior portion of the myocardium removed.
Figure 4:
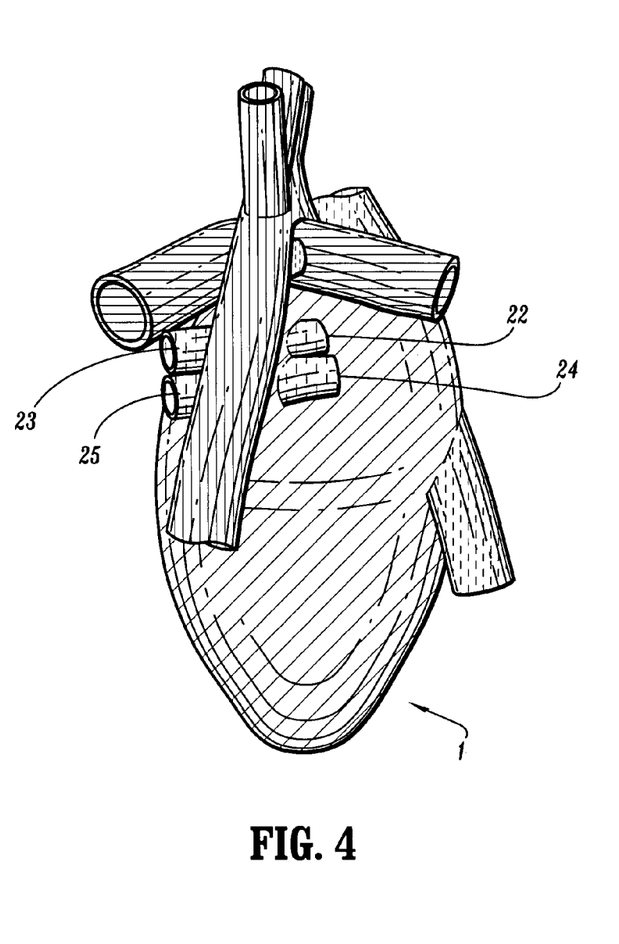
FIG. 4 is a posterior view of the heart model shown in FIG. 3.

In FIGS. 3 and 4, reference numerals 20, 21 and 15 denote the right pulmonary artery, the main pulmonary artery, and the left pulmonary artery, with reference numerals 22–25 illustrating the right upper pulmonary vein, the left upper pulmonary vein, the right lower pulmonary vein and the left lower pulmonary vein respectively. The defective congenital cardiac condition illustrated in FIGS. 1 and 2 shows a defective, insufficiently formed left ventricle 2, a defective mitral valve 12 and aortic valve 26 and an atrial septal defect 27, in addition to the patent ductus arteriosus 19, and a coarctation of the aorta 19a. Additionally, the atrial septal defect 27 is present between the right and left atria as best seen in the model of FIG. 3. It is this complex combination of anatomic defects that the surgeries shown in the accompanying heart models are designed to repair and remedy.

Figure 5:
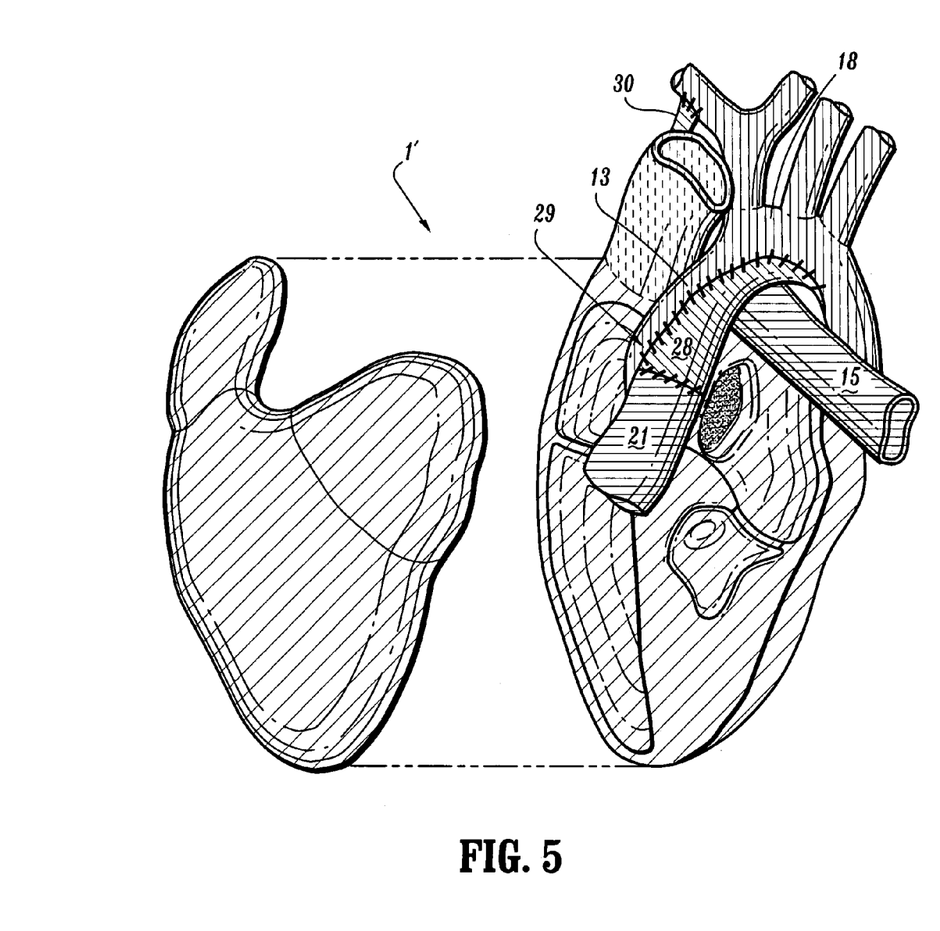
FIG. 5 is an exploded, left anterior oblique view of a teaching model and illustrating a first surgery or stage in a surgical procedure for repair of the defective heart.
Figure 6:
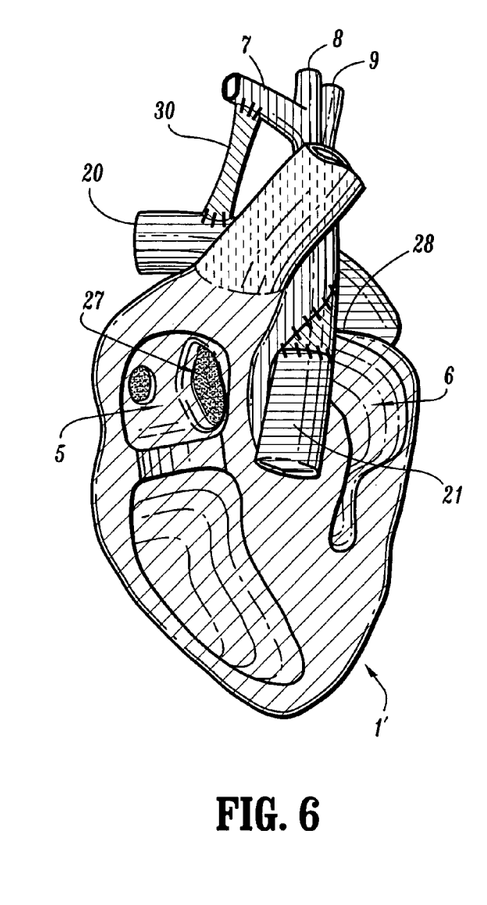
FIG. 6 is a right anterior oblique view of the heart model shown in FIG. 5 and with the anterior portion of the myocardium removed.
Figure 7:
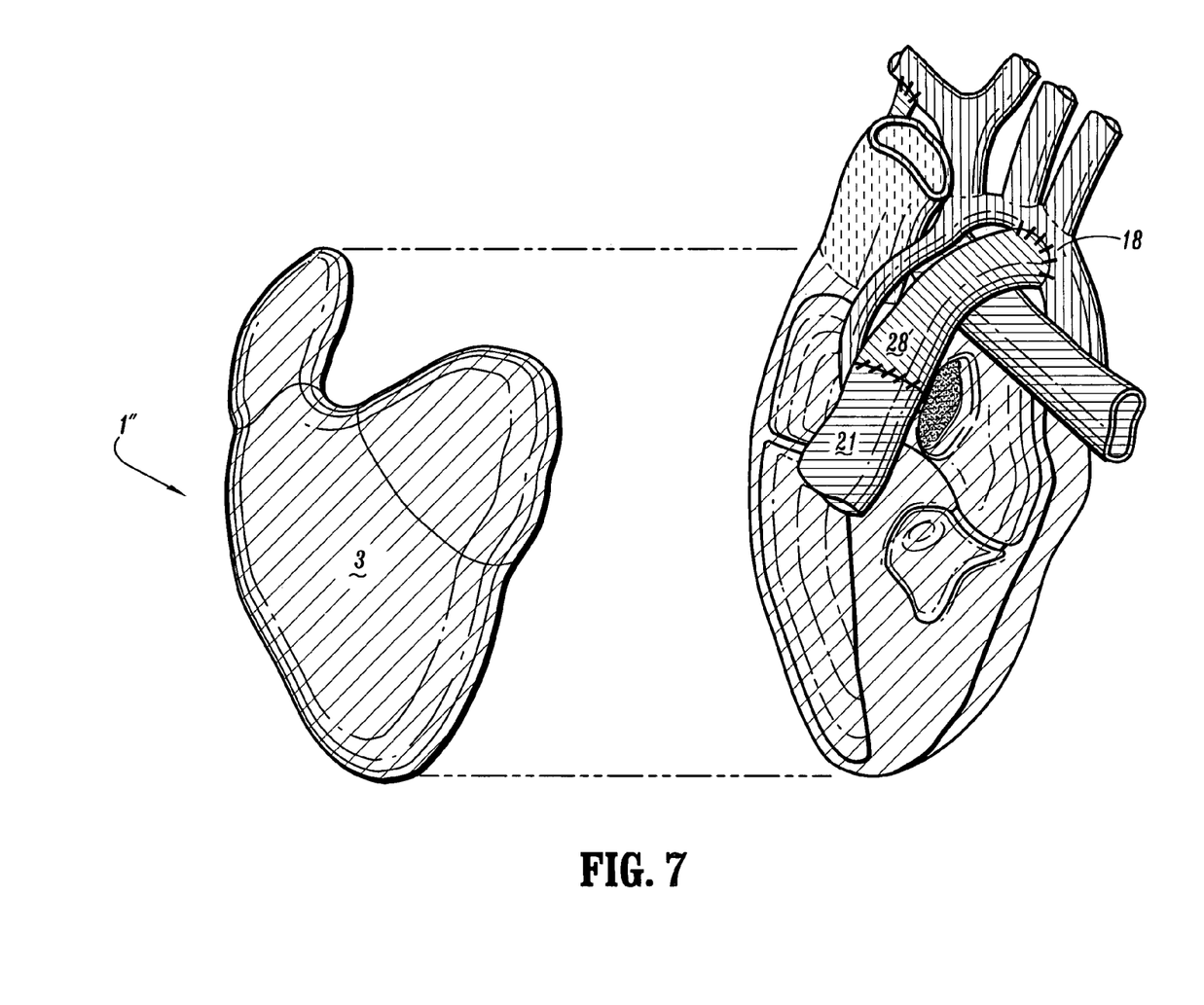
FIG. 7 is an exploded left anterior oblique view of a heart model similar to 5 and illustrating an alternative procedure for repair of a defective heart in the first surgical stage.

FIGS. 5–7 show a heart model 1' representing completion of a first or Stage I surgical palliation for hypoplastic left heart syndrome, also termed Norwood Stage I, involving patent ductus artereosus ligation. Such surgery takes place roughly 3 to 7 days after birth. In this first surgery, an artificial Gortex graft 28 is applied to the ascending aorta 13 and aortic arch 18 and which is sutured, in turn, to the root of a surgically transected main pulmonary artery to create a neoaorta 29. Secondly, an atrial septectomy is performed to enlarge the atrial septal defect 27 between the the left 6 and right 5 atria. Thirdly, a modified Blalock-Taussig shunt 30 is connected between the right subclavian artery 7 and right pulmonary artery 20. Reference numeral 21 denotes the pulmonary artery root. FIG. 7 illustrates a completed first surgical stage similar to FIGS. 5 and 6, but without the diminuitive ascending aorta being sutured to a Gortex graft; in this embodiment, a separate artificial Gortex tube 28' is implanted and sutured to interconnect the periductial aortic arch 18 and the pulmonary artery root 21, bypassing the diminutive ascending aorta.

Figure 8:
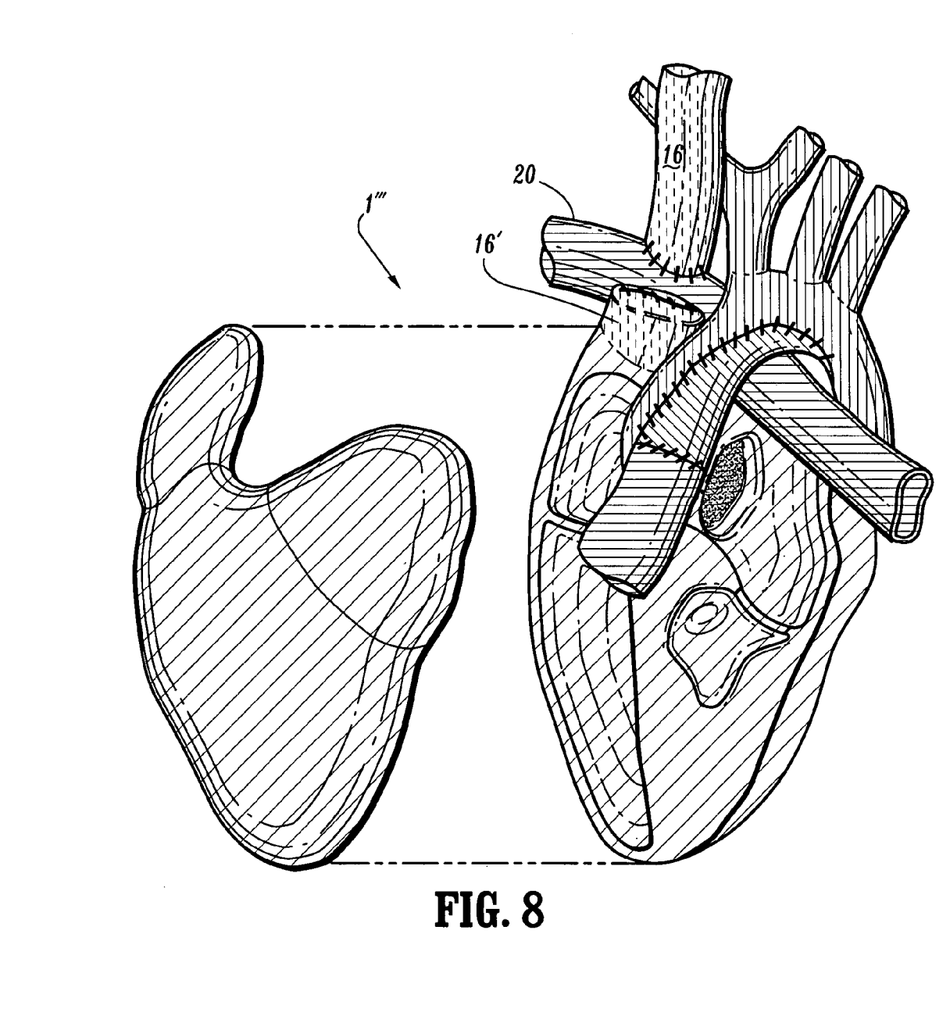
FIG. 8 is an exploded left anterior oblique view of a heart model and illustrating a second surgery or surgical state for the repair of a defective heart.
Figure 9:
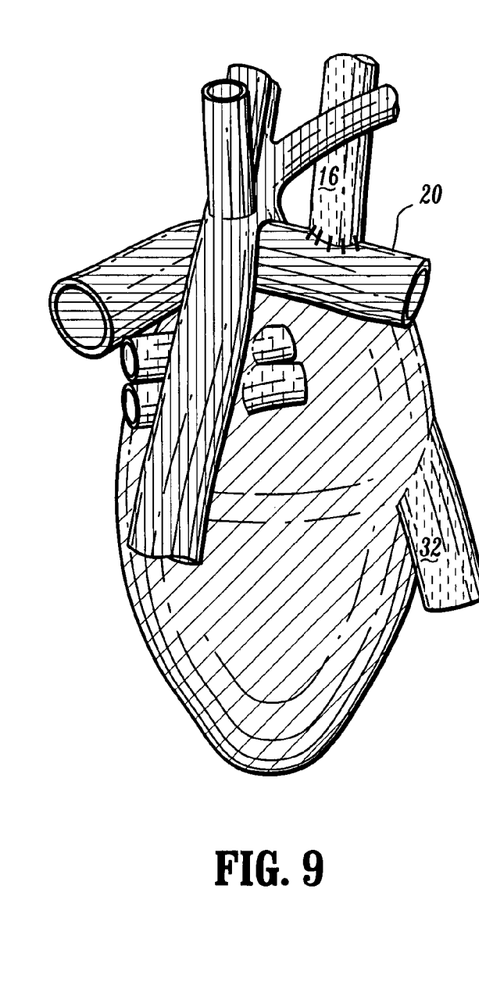
FIG. 9 is a posterior view of the heart model shown in FIG. 8.

FIGS. 8 and 9 constitute a heart model illustrating completion of Stage II surgical palliation for hypoplastic left heart syndrome, which normally takes place about 6 to 9 months after the initial surgical stage I shown in FIGS. 5–7. In this second surgical stage, a bidirectional cavo-pulmonary shunt or bidirectional Glenn shunt is created using several large vessels around the heart. More particularly, the Blalock-Taussig shunt 30 is removed, and the superior vena cava 16 surgically divided and connected to the right pulmonary artery 20, leaving a superior vena cava stump 16' which is sutured closed. Reference numeral 32 denotes the inferior vena cava.

Figure 10:
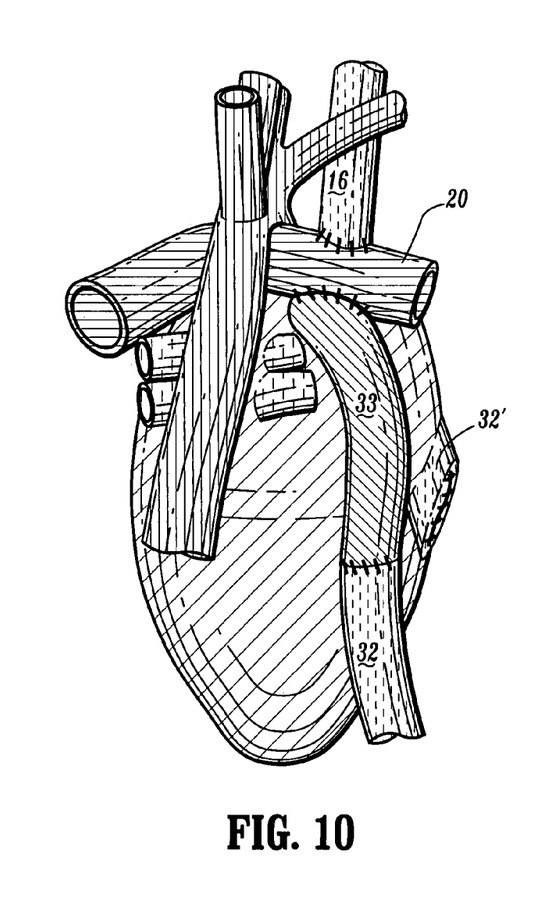
FIG. 10 is a posterior view of a heart model illustrating a third surgery or surgical stage in the repair of a defective heart.
Figure 11:
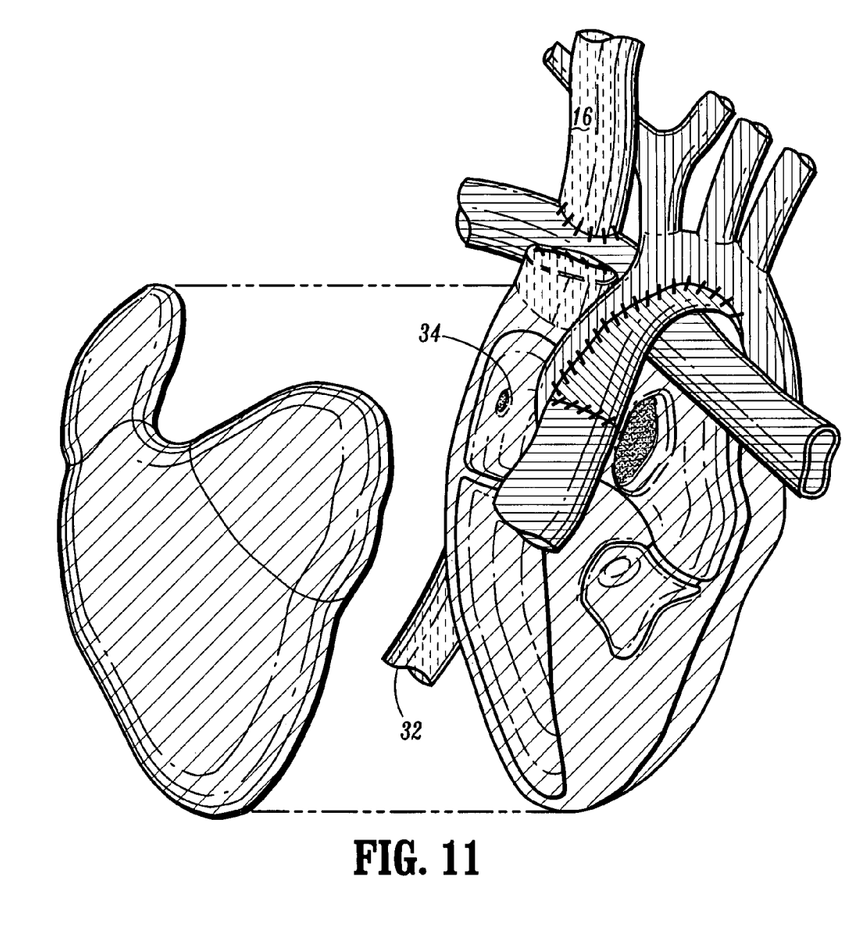
FIG. 11 is an exploded, left anterior oblique view of the heart model shown in FIG. 10.
Figure 12:
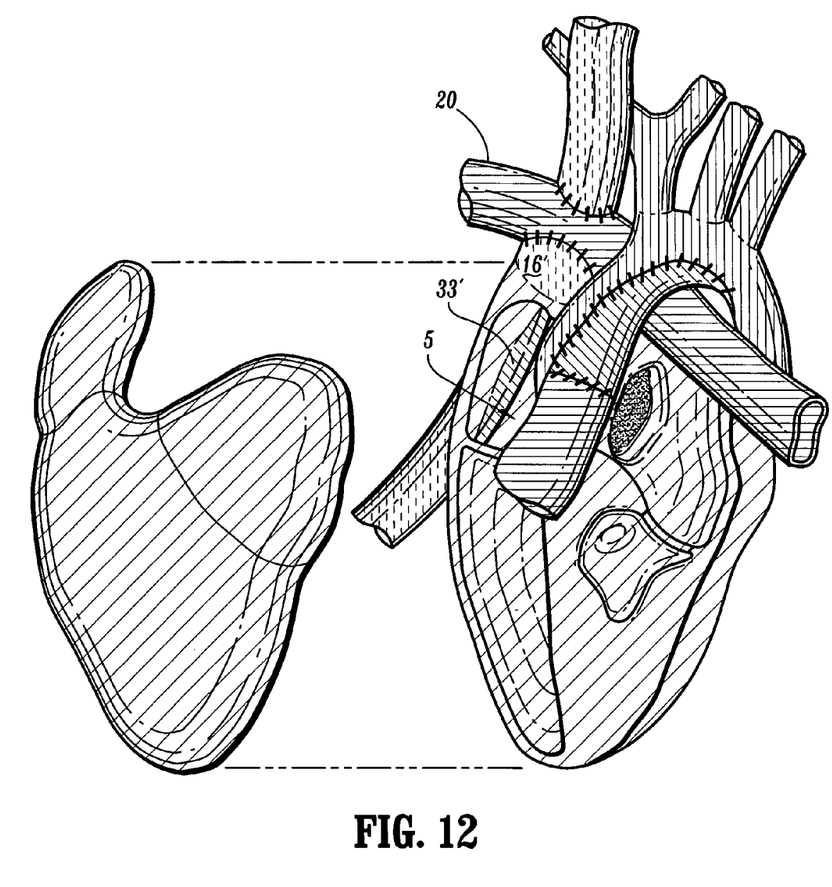
FIG. 12 is an exploded, left anterior oblique view similar to FIG. 11 and illustrating an alternative procedure for the repair of the defective heart in the third surgical stage.
Figure 13:
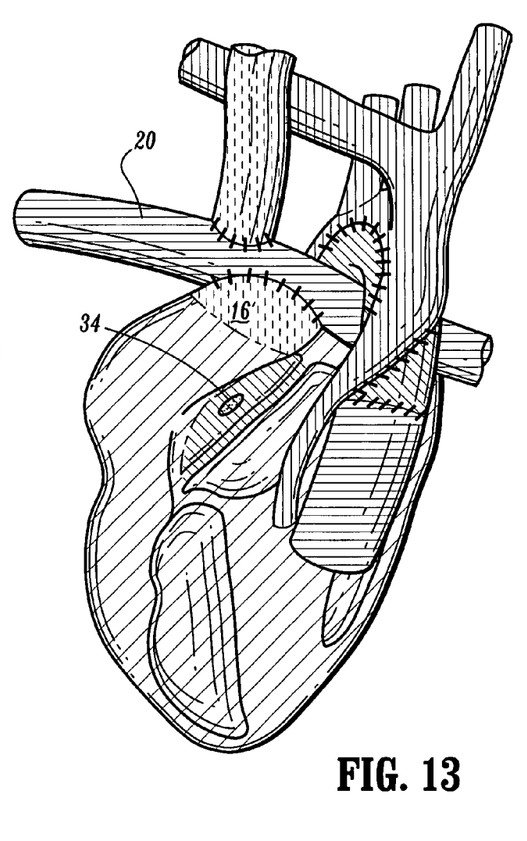
FIG. 13 is a right anterior oblique view of the heart model shown in FIG. 12.

Finally, FIGS. 10–13 illustrate the third surgical stage usually occurring 5 to 7 years after birth, with FIGS. 10 and 11 illustrating cardiac repair by extracardiac Fontan procedure, and FIGS. 12 and 13 illustrating repair by intracardiac Fontan procedure. More particularly, the extracardiac Fontan procedure shown in FIGS. 10 and 11 has a baffle 33, manufactured, e.g., by synthetic Gortex, interconnecting the inferior vena cava 32 and right pulmonary artery 20. Reference numeral 32' denotes a sutured inferior vena cava stump with reference numeral 16 denoting the superior vena cava. Additionally, a fenestration 34 is placed in the Fontan as it passes the lateral wall of the right atrium to allow for pressure release upon unwanted pressure buildup in the Fontan. FIGS. 12 and 13 illustrate a variant of the third surgery, namely placement and insertion of the baffle 33' directly into the right atria 5 of the heart. In this embodiment, the fenestration 34 in the baffle 33' is also provided into the right atria 5, the difference being the native inferior vena cava is not surgically altered, and the intracardiac Fontan directs blood flow along the interior lateral wall of the right atrium. The previously sutured-over superior vena cava stump 16' is now made patent and interconnected into the right pulmonary artery 20. The superior vena cava stump 16' may have already been sutured to the right pulmonary artery 20, but with its internal orifice covered over in the previous surgical stage.

The illustrated heart models can be manufactured from any suitable materials, e.g., synthetic plastic such as polyethylene terephthalate, polyvinyl chloride, etc.

An especially preferred material includes the plastic manufactured under the trade name "Friendly Plastic" by American Art Clay Co., Inc., Indianapolis, Ind. 46222. As shown in the accompanying figures, the various components have been colored to enhance comprehension of the various surgical steps taking place. In particular, the following components have been color-coded in the following fashion to enhance teaching comprehension:

light blue—the native main pulmonary artery and right and left branch pulmonary arteries;
dark blue—the native superior vena cava and inferior vena cava;
red—the native aorta (ascending, arch and descending), and native aortic branches (brachiocephalic artery dividing into right subclavian artery and right common carotid artery, left common carotid artery and left subclavian artery);
purple—ductus atreriosus;
green—any material that is not native to a patient's own anatomy, or is taken from its original anatomical position to be used as part of the surgical reconstruction (e.g., Gortex grafts or patches, donor homograft material, or pericardial tissue used elsewhere as a patch or reconstructive; and
white—valve leaflets and chordae tendineae.

Figure 14:
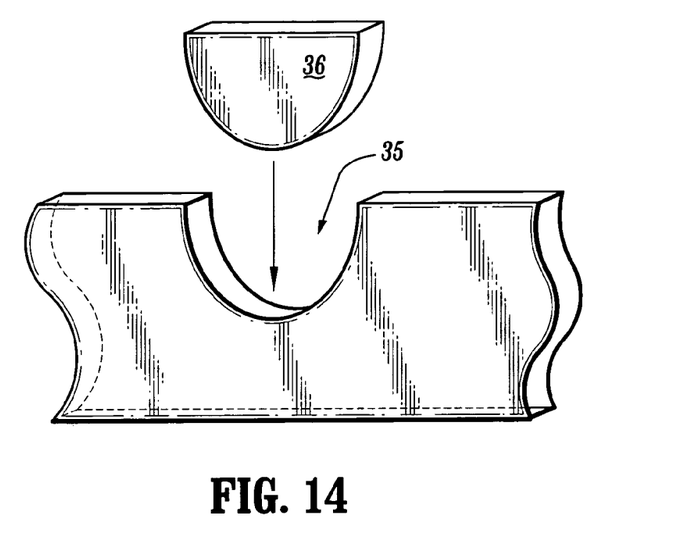
FIG. 14 schematically illustrates coupling of two components by tongue-in-groove arrangement in accordance with the inventive model.

Various types of couplings between plastic components can be provided to illustrate interconnection and detachment of the various veins and arteries to illustrate the various stages of surgeries as shown, e.g., in FIGS. 1–13 for repair of hypoplastic left heat syndrome. In one type of engagement or coupling as shown, e.g., in FIG. 14, a recessed groove 35 can be provided in one member with a corresponding extension 36 provided on a complementary component having a double thickness in a middle of a slide-in portion 36 and a single thickness rim protruding from three edges thereof such that the slide-in portion 36 can be slid into the groove 35 and effectively retained therein. Such coupling or interlocking is especially advantageous for illustrating coronary artery transplant during arterial switch or Ross. The double layer of plastic or other acceptable, e.g., synthetic material, is provided with the slightly indented groove along sides and a bottom of the cut-out shape. The groove 35 accepts the single-thickness rim such that the double thickness of the slide-in portion sits exactly into the double layer of plastic that accepts the cut-out.

Figures 15, 16, 17:
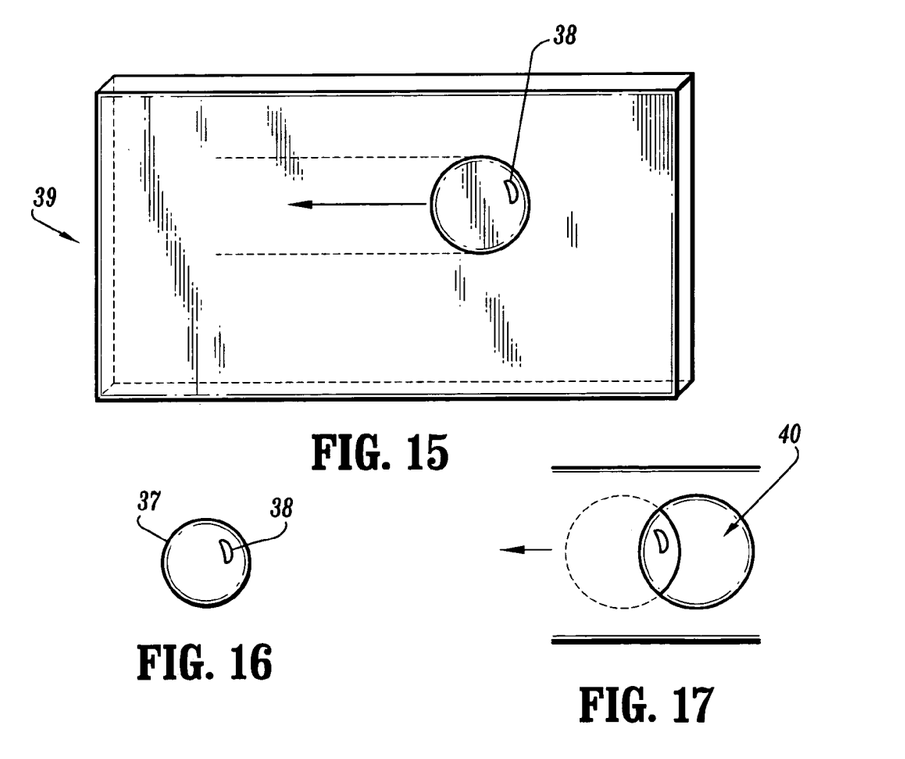
FIG. 15 schematically illustrates concentric coupling of two components forming part of the inventive model.
FIG. 16 illustrates the inner concentric sliding member shown in FIG. 15.
FIG. 17 illustrates part of the outer concentric member of FIG. 15 with the inner concentric member slidably arranged therein.

In an alternative form of coupling as shown, e.g., in FIGS. 15–17, a sliding door/window type coupling of interlocking components can be provided to illustrate repair of atrial septal defects, ventricular septal defects and fenestration in the teaching heart model. In such interlocking, a single layer of plastic 37 will slide in between the outer layers to represent a "defect" in a wall of a heart. Such movable plastic layer 37 will have a protruding handle 38 to permit sliding back and forth. A double thickness wall 39 representing the wall of heart muscle can be provided with a space in between to accept the sliding door 37. A hole 40 is provided through one of the lateral walls to permit sliding by grasping the handle 38. These concentrically arranged components have been illustrated with substantially rectangular cross-sections, but may take any geometric shape in accordance with the claimed invention.

Figure 18:
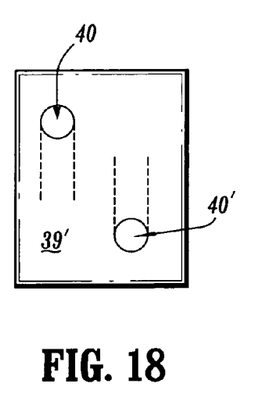
FIG. 18 illustrates a posterior plastic member forming the outer concentric member of FIG. 15.
Figure 19:
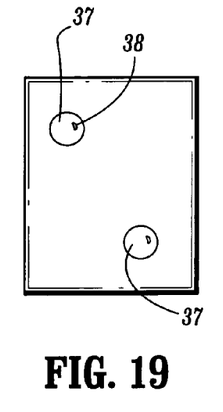
FIG. 19 illustrates the inner sliding member of FIG. 16.
Figure 20:
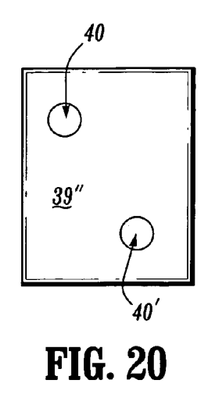
FIG. 20 illustrates an anterior plastic member forming the outer concentric member of FIG. 15.
Figure 21:
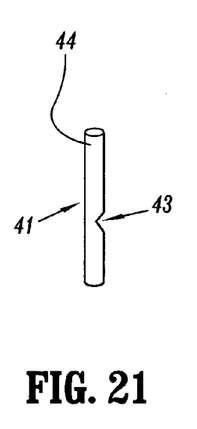
FIG. 21 illustrates a male pin member for coupling a component in accordance with the inventive model.
Figure 22:
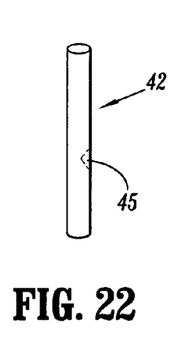
FIG. 22 illustrates a hollow female pin member for receiving the male pin member of FIG. 21.
Figure 23:
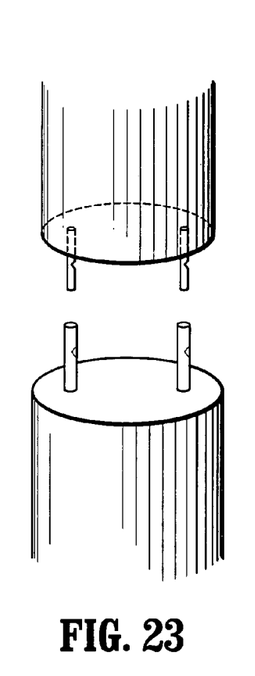
FIG. 23 schematically illustrates coupling of tubular components forming, e.g., a blood vessel in the inventive model, with the pin members shown in FIGS. 21 and 22.

FIGS. 18–20 schematically illustrate manufacturing the sliding doors with FIG. 18 denoting posterior plastic 39', FIG. 19 the middle sliding door 37 and FIG. 20 the anterior plastic 39". The outer walls 39', 39" can be assembled by simple shape-fitting or molding together. Plastic pins 41 and acceptor pins 42 which can be used to couple components illustrating, e.g., the arterial switch, neoaorta attachment to the pulmonary artery base, bidirectional cavopulmonary shunt and Fontan, are shown in FIGS. 21–23 with FIG. 23 schematically illustrating coupling of respective tubing through these pins mounted at ends of the respective tubing. The pin 41 shown in FIG. 21 comprises a notch 43 and a magnet 44 embedded in a top portion thereof. The pin 42 shown in FIG. 22 is hollow, designed to receive the respective pin 41 shown in FIG. 21, and is also provided with an internal protrusion 45 designed to catch in the notch 43 of the embedded male member pin 41.

Figure 24:
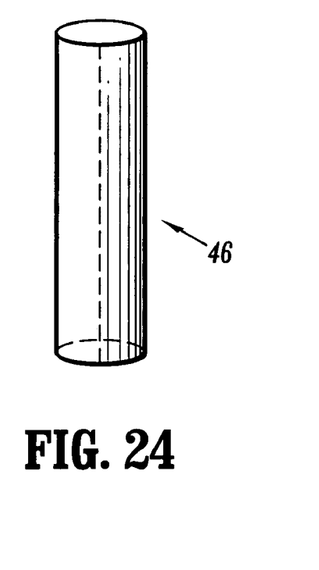
FIGS. 24 and 25 respectively illustrate a tubular component forming a blood vessel in accordance with the inventive model before and after filleting.
Figure 25:
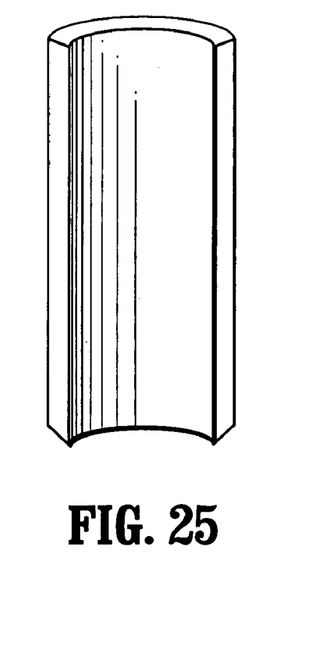

FIGS. 24 and 25 respectively illustrate assembly of a tube 46 constituting one of the vessels, e.g. an artery or vein. FIG. 24 illustrates a perspective view of a tube fully closed, e.g., prior to filleting to illustrate surgical opening. FIG. 25 illustrates the same tube after opening or filleting to illustrate connection or disconnection during the various surgical procedures as illustrated above. Pliable material, e.g., a metal sheet, can be embedded within a piece of clay or plastic to enhance shape retention of the tube both before and after filleting.

Figure 26:
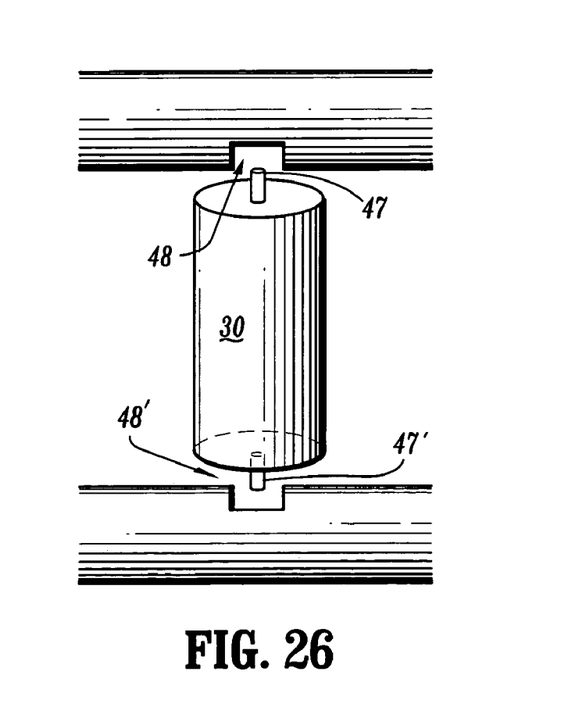
FIG. 26 schematically illustrates coupling of two adjacent tubular components through a third substantially cylindrical component in the inventive model.
Figure 27:
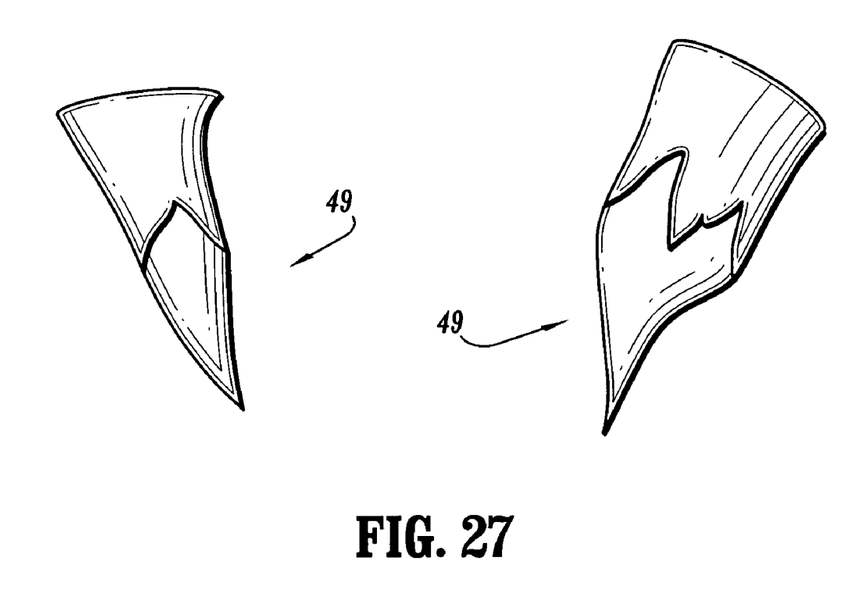
FIG. 27 illustrates components representing valve leaflets and chordea in the inventive model.
Figure 28:
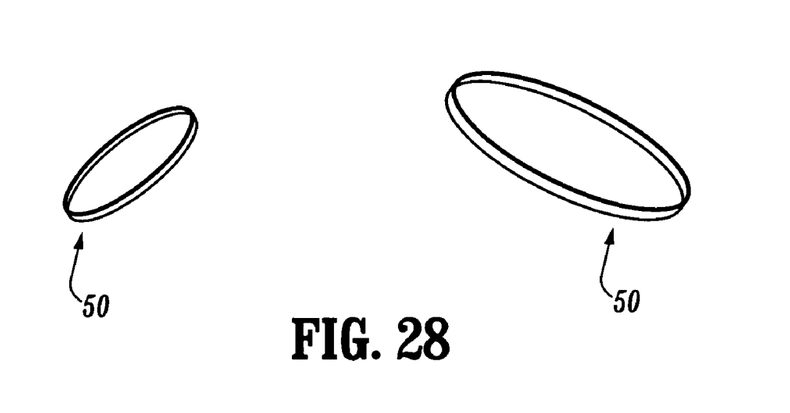
FIG. 28 illustrates components representing valve rings in the inventive model.

FIG. 26 is a schematic posterior view illustrating sliding coupling of parts illustrating coupling of a Blalock-Taussig shunt 30 in the inventive model. The shunt component itself, illustrated by a cylindrical piece, contains plastic or metal pegs 47, 47' protruding from opposite ends thereof and arranged to slide into and mate with corresponding notches 48, 48' provided in adjacent components illustrating the arteries. Valve leaflets and chordea can be constituted by white-colored paper-like material glued to valve rings and papillary muscles as illustrated, e.g., in FIG. 27 while the valve rings 50 themselves can be constituted by thin metallic rings as illustrated in FIG. 28.

The invention has been illustrated in FIGS. 1–13 with respect to teaching repair of hypoplastic left heart syndrome. However, models in accordance with the claimed invention can be prepared to teach cardio-surgical technique for repairing any number of cardiac abnormalities, such as transposition of the great arteries, atrio-ventricular canal, total anomalous pulmonary venous return, partial anomalous pulmonary venous return, double outlet right ventricle, tetrology of fallot, atrial septal defect and ventricular septal defect. Other medical and surgical techniques can be taught by the inventive models such as sites of cannulation for cardiopulmonary bypass and extracorporeal membrane oxygenation, fetal circulation and Ross procedure.

While the inventive model has been illustrated and described with detachable and interchangeable components to show the various progressions in cardiac surgery, it is also possible within the scope of the present invention to provide a series of fixed models showing each of the surgical stages without provision of attachable and removable components. For example, four separate heart models could be prepared to show the following conditions:

pre-operative defective condition analogous to FIGS. 1–4;
first surgical stage analogous to FIGS. 5–7;
second surgical stage analogous to FIGS. 8 and 9; and
third surgical stage analogous to FIGS. 10–13.

These four respective models could be provided with a minimum number of removable components, e.g., just a detachable cover 3 representing the anterior portion of the myocardium. Such models can also be manufactured from plastic, or additionally from other material such as ceramic or clay.

The preceding description of the present invention is merely exemplary and not intended to limit the scope thereof in any way.

What is claimed is:

1. A model for teaching or illustrating surgical and/or medical technique, comprising
   a base component representing tissue or an organ, and
   several components structured and arranged to be couplable to and detachable from the base component and/or to one another, to illustrate different positions of the components with respect to one another representing different phases the surgical and/or medical technique,
   wherein the base component comprises a heart containing ventricles and the other components are tube-shaped and represent veins or arteries.

2. The model of claim 1, wherein, the components are formed of ceramic, clay, or synthetic material.

3. The model of claim 2, wherein the synthetic material is plastic.

4. The model of claim 2, wherein the components are formed of plastic and comprise male/female snap couplings at respective ends thereof to allow coupling, detaching and re-coupling of the various components with one another in the different positions.

5. The model of claim 2, wherein the base component and other components are color-coded to facilitate illustration or teaching of the surgical and/or medical technique.

6. The model of claim 1, wherein the base components and components representing the veins or arteries are color-coded to facilitate illustration or teaching of the surgical and/or medical technique.

7. The model of claim 1, wherein the base components and other components are structured and arranged to be couplable, detachable, and recouplable to each other in the various positions to illustrate various stages during cardiac surgery or a series of different cardiac surgeries for repair of the heart.

8. The model of claim 7, wherein the base component and other components are structured and arranged to illustrate various surgeries for repair of hypoplastic left heart syndrome.

9. The model of claim 1, comprising components structured and arranged to be removably coupled together by tongue-in-groove arrangement.

10. The model of claim 1, comprising components structured and arranged to be removably coupled together by complementary-shaped male and female pin members.

11. The model of claim 10, wherein said pin members comprise respective complementary indentations and protrusions to facilitate removable coupling in a snap-fitting manner.

12. A model for teaching or illustrating surgical and/or medical technique, comprising
   a base component representing tissue or an organ,
   several components structured and arranged to be couplable to and detachable from the base component and/or to one another, to illustrate different positions of the components with respect to one another representing different phases in the surgical and/or medical technique, and
   components structured and arranged to be removably coupled together by concentrically sliding with respect to one another.

13. The model of claim 12, wherein an outer hollow one of said concentric components is provided with a lateral opening and an inner one of said concentric components is provided with a handle extending through said lateral opening of said outer concentric component to allow said inner component to be slid within said outer component.

14. A model for teaching or illustrating surgical and/or medical technique comprising
   a base component representing tissue or an organ,
   several components structured and arranged to be couplable to and detachable from the base component and/or to one another, to illustrate different positions of the components with respect to one another representing different phases in the surgical and/or medical technique, and
   at least one tubular member structured and arranged to retain shape both before and after filleting.

15. A model for teaching or illustrating surgical and/or medical technique, comprising
   a base component representing tissue or an organ,
   several components structured and arranged to be couplable to and detachable from the base component and/or to one another, to illustrate different positions of the components with respect to one another representing different phases in the surgical and/or medical technique, and
   at least one substantially cylindrically-shaped member having pegs protruding from opposite ends thereof and structured and arranged to removably seat in notches provided in other coupling members to couple two such members together therethrough.

16. A method for teaching cardiac surgical technique comprising the steps of providing a heart model showing a base heart component containing atria and ventricles and tubular members interconnected with the base heart component and representing various arteries and veins, and
   detaching and interconnecting the various tubular members with one another to illustrate various cardiac surgeries or stages in a surgery.

17. The method of claim 16, wherein the various components are color-coded.

18. The method of claim 16, wherein the various components are structured and arranged to be couplable to and detachable from one another by complementary-shaped locking members affixed thereto.

19. The method of claim 16 comprising several base heart components and illustrating surgical repair of hypoplastic left heart syndrome.

20. A series of models for teaching or illustrating surgical or medical technique of the heart, comprising
   a first model illustrating pre-operative defective condition of the heart;
   a second model illustrating a first stage in surgical repair of the heart;
   a third model illustrating a second stage in the surgical repair of the heart; and
   a fourth model illustrating a third stage showing completion of surgical technique.

21. The series of claim 20, wherein said four models illustrate the stages in surgical repair of hypoplastic left heart syndrome.

* * * * *